(12) United States Patent
Aurbeck

(10) Patent No.: US 7,938,301 B2
(45) Date of Patent: May 10, 2011

(54) VEHICLE-MOUNTED CONTAINER FOR A WHEEL CHOCK

(76) Inventor: Everrett R Aurbeck, Littleton, CO (US)

( * ) Notice: Subject to any disclaimer, the term of this patent is extended or adjusted under 35 U.S.C. 154(b) by 937 days.

(21) Appl. No.: 11/839,000

(22) Filed: Aug. 15, 2007

(65) Prior Publication Data

US 2009/0045236 A1   Feb. 19, 2009

(51) Int. Cl.
*B60R 9/00* (2006.01)
*B60R 9/055* (2006.01)

(52) U.S. Cl. .......................................... 224/518; 116/50

(58) Field of Classification Search ............... 224/512, 224/514, 515, 518; 116/28 R, 50; 206/315.2, 206/315.6, 459.1, 459.5, 804, 817, 822; 221/6, 221/14, 17; 150/101, 102; 215/365; 220/476, 220/480, 810, 827; 232/34, 35, 37
See application file for complete search history.

(56) References Cited

U.S. PATENT DOCUMENTS

| D236,823 S | 9/1975 | Switzer | |
|---|---|---|---|
| D245,416 S | 8/1977 | Carpenter | |
| 4,354,580 A * | 10/1982 | Delasantos et al. | 188/4 R |
| 4,582,176 A | 4/1986 | Roberts | |
| 4,923,114 A * | 5/1990 | Fiske, Jr. | 232/34 |
| 5,232,259 A | 8/1993 | Booker | |
| 5,251,947 A | 10/1993 | Kirila | |
| 5,392,907 A * | 2/1995 | Blanchard et al. | 206/315.6 |
| 5,738,260 A | 4/1998 | Kirtland | |
| 5,941,589 A | 8/1999 | Perlman | |
| 6,202,850 B1 * | 3/2001 | Held | 206/527 |
| 6,330,944 B1 * | 12/2001 | DeMichele | 206/315.3 |
| 6,390,245 B1 | 5/2002 | Metz | |
| 6,626,293 B2 * | 9/2003 | St. Jeor | 206/315.6 |
| 7,032,720 B2 | 4/2006 | Jette | |

* cited by examiner

*Primary Examiner* — Justin M Larson
*Assistant Examiner* — Adam Waggenspack
(74) *Attorney, Agent, or Firm* — Leyendecker & Lemire, LLC; Kurt Leyendecker

(57) ABSTRACT

The present invention comprises a chock holder adapted to be mounted to the bottom side of a trailer that includes a notification mechanism that automatically deploys when a chock is removed from the holder.

15 Claims, 6 Drawing Sheets

VEHICLE-MOUNTED CONTAINER FOR A WHEEL CHOCK

FIELD OF THE INVENTION

The present invention relates generally to containers that are adapted to be mounted to a truck or trailer and contain a wheel chock therein.

BACKGROUND

When unloading tractor trailer rigs and trucks at loading dock, truck operators are required by Department of Transportation & OCHOA regulations as well as other state and Federal regulations to chock the vehicle's wheels. When storing a trailer apart from a tractor, regulations also require a trailer's wheels be chocked.

Tractor operators often carry there own chocks in the cab for use under the required situations. In other circumstances, operators rely upon a loading dock having chocks available for use and don't carry their own.

Even for those operators that own chock(s), they often forget them when leaving a dock. In other circumstances, a chock properly chocking a first trailer at a loading dock may be pilfered by an operator of a second trailer after he/she has pulled into a neighboring bay on a dock.

Ultimately, safety suffers when a trailer's wheels are not properly chocked as the risk that the trailer will roll even if a couple of feet and cause injury to a person nearby is substantially increased.

DETAILED DESCRIPTION

Figure 1:
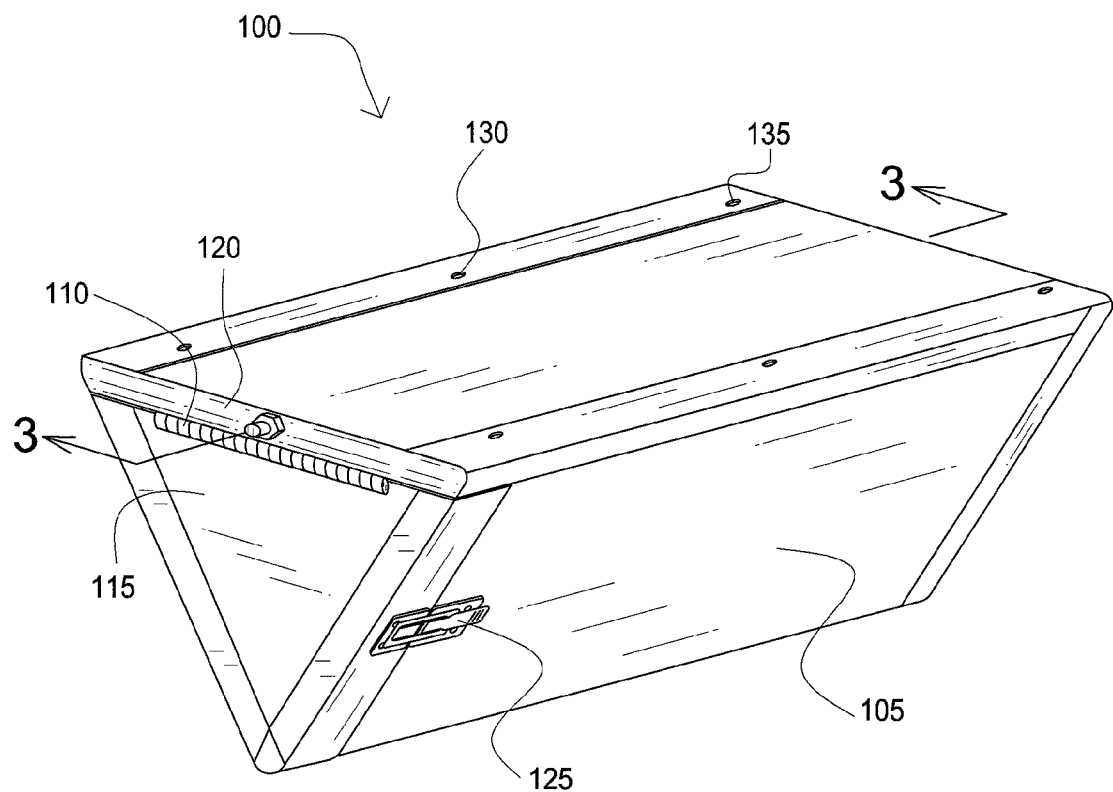
FIG. 1 is an isometric front view of a trailer-mountable chock holder according to one embodiment of the present invention.

Embodiments of the present invention comprise a chock holder adapted to be mounted to the bottom side of a trailer. Advantageously, the container includes a notification mechanism that deploys a visual indicator when a chock is removed from the holder.

When the holder is mounted to the underside of a trailer proximate a vertical side thereof as described herein, the visual indicator, such as a brightly colored flag in at least one variation, is easily visible in a rear view side mirror to the operator of a tractor. Accordingly, an operator is alerted when he/she is sitting in the cab presumably ready to pull away from a dock or other location to the fact that he/she has not stowed his/her chock in the holder.

The notification mechanism can vary among embodiments but in at least one embodiment, the mechanism utilizes a biased slider to which a brightly colored flag is attached that automatically deploys with a very high degree of reliability whenever the chock is removed from the container. When the chock is placed back in the container the slider is biased rearwardly and the flag is drawn into the container.

Terminology

The term "or" as used in this specification and the appended claims is not meant to be exclusive rather the term is inclusive meaning "either or both".

References in the specification to "one embodiment", "an embodiment", "a preferred embodiment", "an alternative embodiment", "one variation", "a variations" and similar phrases mean that a particular feature, structure, or characteristic described in connection with the embodiment is included in at least an embodiment of the invention. The appearance of the phrase "in one embodiment" or "in an embodiment" in various places in the specification are all not necessarily meant to refer to the same embodiment.

The term "couple" or "coupled" as used in this specification and the appended claims refers to either an indirect or direct connection between the identified elements, components or objects. Often the manner of the coupling will be related specifically to the manner in which the two coupled elements interact Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiments and are not necessarily intended to be construed as limiting.

As applicable, the terms "about" or "generally" as used herein unless otherwise indicated means a margin of +−20%. Also, as applicable, the term "substantially" as used herein unless otherwise indicated means a margin of +−10%. It is to be appreciated that not all uses of the above terms are quantifiable such that the referenced ranges can be applied.

The term "vehicle" is used herein in a broad sense to mean any contrivance designed to travel on road or rail either under its own power or by being attached to another vehicle that pushes or pulls the vehicle. In this sense, an over-the-road trailer of a tractor and trailer rig is considered a vehicle as is the tractor.

An Embodiment of a Vehicle-Mounted Chock Holder

An embodiment of a chock holder 100 according to the present invention is illustrated in FIGS. 1-6. Essentially, the holder comprises: (i) a container 105; (ii) a hinged front door 115; and (iii) a notification assembly that deploys a highly visible flag 160 when an associated chock 140 is removed from the container.

Figure 6:
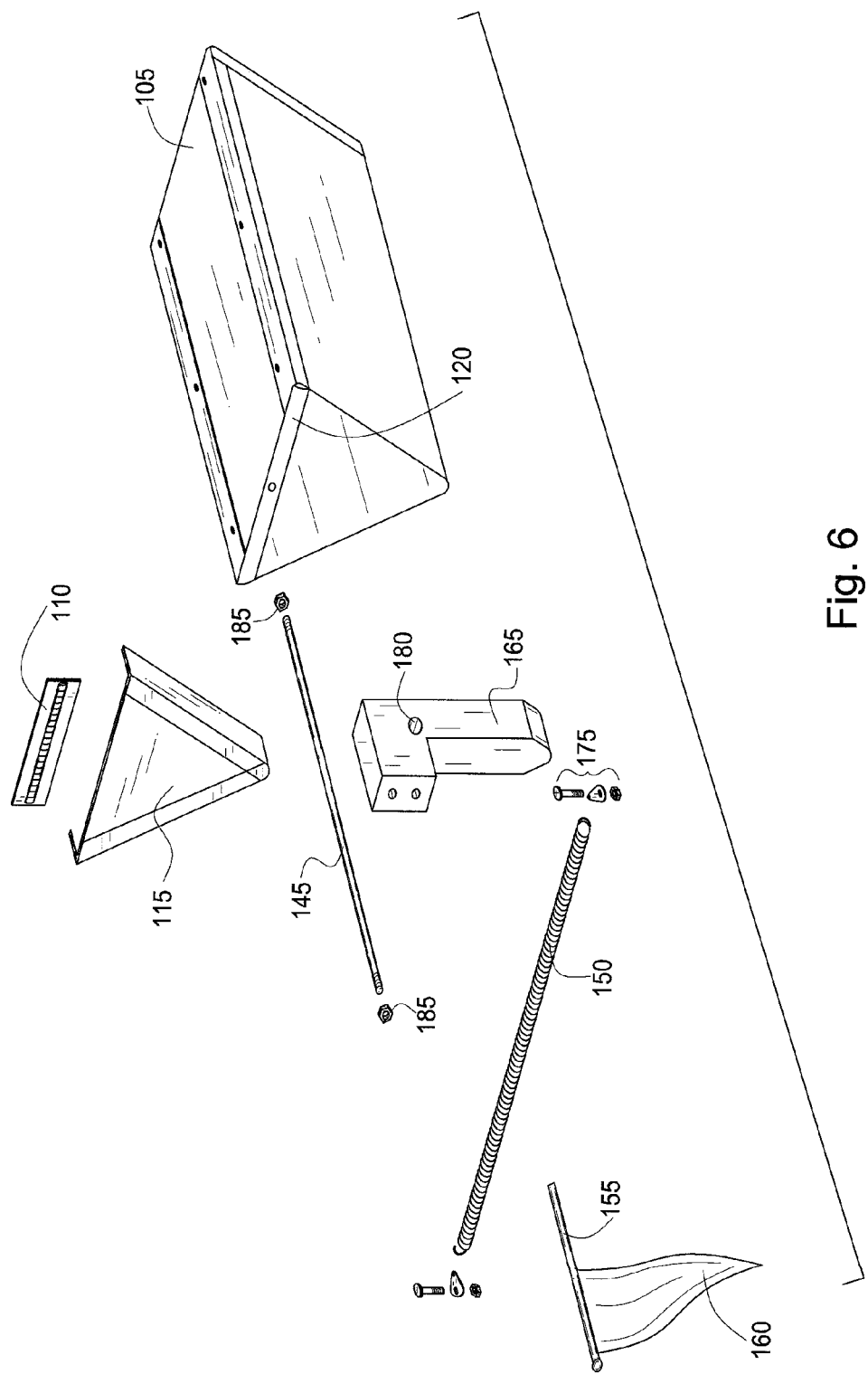
FIG. 6 is an exploded view of a chock holder according to one embodiment of the present invention.

Referring primarily to FIGS. 1 & 6, the elongated container 105 has a triangular cross section and is closed on a rear side and substantially open on a front side to which the front door 115 is hingably attached. The box is sized to receive a standard chock 140, which also has a triangular cross section, therein such that the sides of the chock generally rest against the respective left and right sides of the container thereby minimizing any movement of the chock when stowed.

The container 105 can be fabricated from any suitable material such as plastic, aluminum, fiberglass composite, or steel. In at least one variation, the container is made of 0.075" thick stainless steel sheet that is formed in two pieces into the container and welded and/or mechanically together. Two of the primary considerations in choosing a material from which to fabricate the container include strength and corrosion resistance given that (i) the holder as mounted underneath a trailer will be subject to road grime, water, snow, sleet and deicing chemicals, and (ii) the weight of a chock contained therein typically exceeds 15 pounds.

Figure 7:
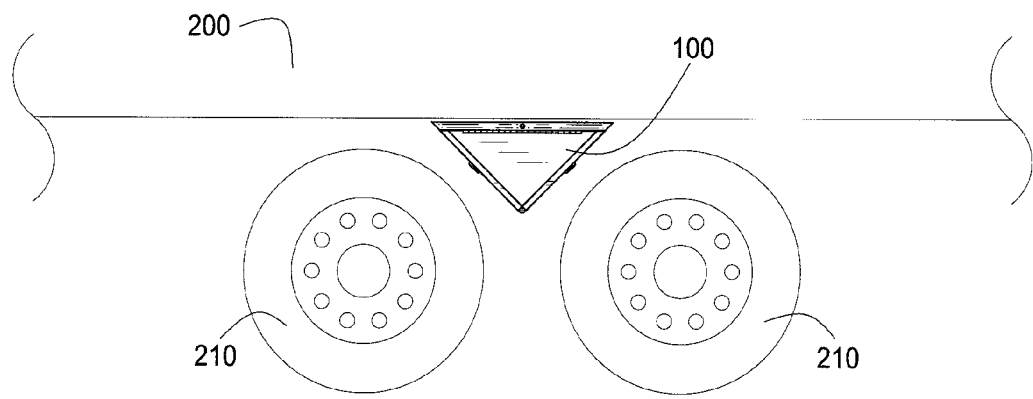
FIG. 7 is an isometric view of the chock holder installed on a trailer according to one embodiment of the present invention.

A top side, which is generally horizontally disposed when the container is properly mounted to the underside of a trailer, includes a plurality mounting holes 135 through which a bolt or other fastener can be received to secure the container to the trailer. In other variations, other mounting means can be provided such as suitably configured brackets. When mounted to a trailer 200 as shown in FIG. 7, the top side is generally parallel and often flush with the underside of the trailer with the left and right sides of the container extending downwardly and inwardly until intersecting with each other along a bottom edge.

As best shown in FIG. 6, a flange 120 extends generally vertically downwardly from a front edge of the top side and over a small top portion of the front side opening. The flange serves two primary purposes: it provides a mounting location for the door hinge 110; and it also provides a guide rod mounting hole for receiving the front end of a guide rod 145 of the notification assembly, which is described in greater detail below. Concerning the hinge, the top portion can be welded, riveted, bolted or otherwise secured to the flange 120 with the corresponding bottom portion being similarly secured to a door 115.

The door 115 is typically fabricated from a similar material as the container although it need not be. As illustrated it swings upwardly to permit access to the container's interior and the chock. When the chock is removed the door typically remains open being held in its open position by the notification mechanism as is described in greater detail below. One or more latch mechanisms 125 as shown in FIG. 1 can be provided to hold the door in its closed position during travel and use of the trailer to prevent the chock from falling out of the container.

Numerous variations on the container and the associated hinged door are contemplated. For instance, the door and container can be constructed of any suitable material using any suitable means. The container need not have a triangular cross section. For instance, the container could be rectangular and sized to receive and contain two chocks that are nested against one another. Further, while the door of the illustrated embodiment opens upwardly, variations are possible wherein the door opens relative to the left or right side of the container. In yet another variation, the door can be eliminated altogether with one or more spring loaded latches located proximate the interior surfaces of one or more container sides being utilized to retain the chock in the container.

The notification mechanism is configured to deploy a brightly colored flag automatically whenever the chock is removed from the container such that an operator of an associated rig will know when he/she looks in his/her rear view mirror that the chock is deployed or at least is not stowed within the container. Accordingly, the chance that the operator will leave a dock without his/her chock is substantially reduced even if the operator's chock has been removed from under the wheels of his/her trailer and placed under another trailer at the dock by another operator or dock worker. Any number of different types of notification mechanism are contemplated by the inventor in addition to the specific mechanism described and illustrated in detail herein.

For instance, an electronic eye system could be utilized wherein a notification light on the container, on the rigs rear view mirror or even in the tractor cab is illuminated when a chock is removed from the holder. The notification light can be in either wireless or wired communication with the electronic eye portion of the mechanism. The notification light module can be portable such that it can be transferred from one tractor to another as the trailer associated with the holder is coupled with different tractors.

Concerning mechanical notification mechanisms, it is appreciated that many different means of automatically deploying a flag or other easily noticeable display can be utilized to accomplish essentially the same result as the mechanism described herein. Other such mechanisms are considered obvious to those of ordinary skill in the art given the benefit of this disclosure.

Referring primarily to FIGS. 2-6, the notification mechanism of the illustrated embodiment can be best described. The notification mechanism comprises: (i) a brightly colored notification flag 160 attached to a flag pole or shaft 155; (ii) a slider 165 typically made of a low friction material; (iii) a guide rod (or member) 145 along which the slider slides; and (iv) a coil spring 150 that biases the slider and the coupled flag and flag pole into a deployed position.

The flag 160 is typically comprised of a brightly colored flexible sheet plastic or fabric that can easily fold and crease when stowed within the container 105. Typical bright colors include fluorescent colors such as safety (or day glow) orange and yellow, although other colors that would be readily visible and even distracting to an operator of a tractor when viewed in a rear view or side mirror can be utilized. The flexible sheet plastic can comprise polyethylene, polypropylene or another sheet plastic material. Further in other variations the flag may comprise a fabric, such as but not limited to nylon, which may be plastic coated. As shown the flag may have a triangular shape but other variations may have another suitable shape including rectangular.

The flag pole or shaft (or other suitable support) 155 is typically about 8-10" inches and length and is secured into a bore provided in the slider 165. It can be comprised of any suitable material including but not limited to steel, aluminum, plastic, and fiberglass. The shaft is typically cylindrical but need not be. In at least one variation, the flag pole is eliminated altogether with a protrusion of the slider extending outwardly with the flag hanging from the protrusion.

The slider 165 as illustrated is comprised of a high (or ultra high) density polyethylene material that has a relatively low coefficient of friction facilitating its ability to easily slide along the intersection of the left and right side of the container proximate a bottom end and along the guide rod through a bore proximate the top end. Other plastics with low friction coefficients may also be used, or in other variations the slider can be made of other materials, such as aluminum. Metallic variations may incorporate rollers to minimize friction and permit easy movement of the slider from deployed and stowed positions.

As illustrated, the slider has a generally inverted-L shape although the shape can vary substantially in variations. The bottom end of the slider is angled to generally match the angle formed by the interesting right and left sides of the container 105. The overall height of the slider is typically a bit less than the distance between the right and left side intersection and the inside surface of the tope side. Proximate the top end of the slider a through bore is provided through which the guide rod 145 passes. The slider bore is substantially parallel with a longitudinal axis of the container. A flag pole bore that is generally parallel to the slider bore and does not typically extend completely through the slider is also provided in which the flag pole 155 is received. The flag pole may be frictionally fit into the bore or it can be adhesively or mechanically secured therein.

As best illustrated in FIG. 6, a spring bore 180 generally perpendicular to the longitiudinal axis of the container 105 also extends through the slider at a location just vertically below the flag pole bore. This bore is adapted to receive the coil spring 150 therethrough proximate the middle of the spring.

The guide rod 145 extends from the rear side of the container where the rear end thereof is secured in place, such as with a threaded nut 185, to a front end which is secured to the downwardly extending flange 120 that partially overhangs the open front side of the container. The front end of the rod is secured in place with a threaded nut or by any other suitable mechanism. The guide rod as its name implies guides the slider along as the slider moves between the deployed and stowed positions. It is appreciated that the guide rod can be replaced with other types of guide members in variations. For instance guide rails can be provided that interface with a suitably designed mating portion of the slider. The design and configuration of any guide mechanism, whether a guide rod or a guide rail configuration can vary substantially as would be obvious to someone of ordinary skill in the art given the benefit of this disclosure.

Figure 2:
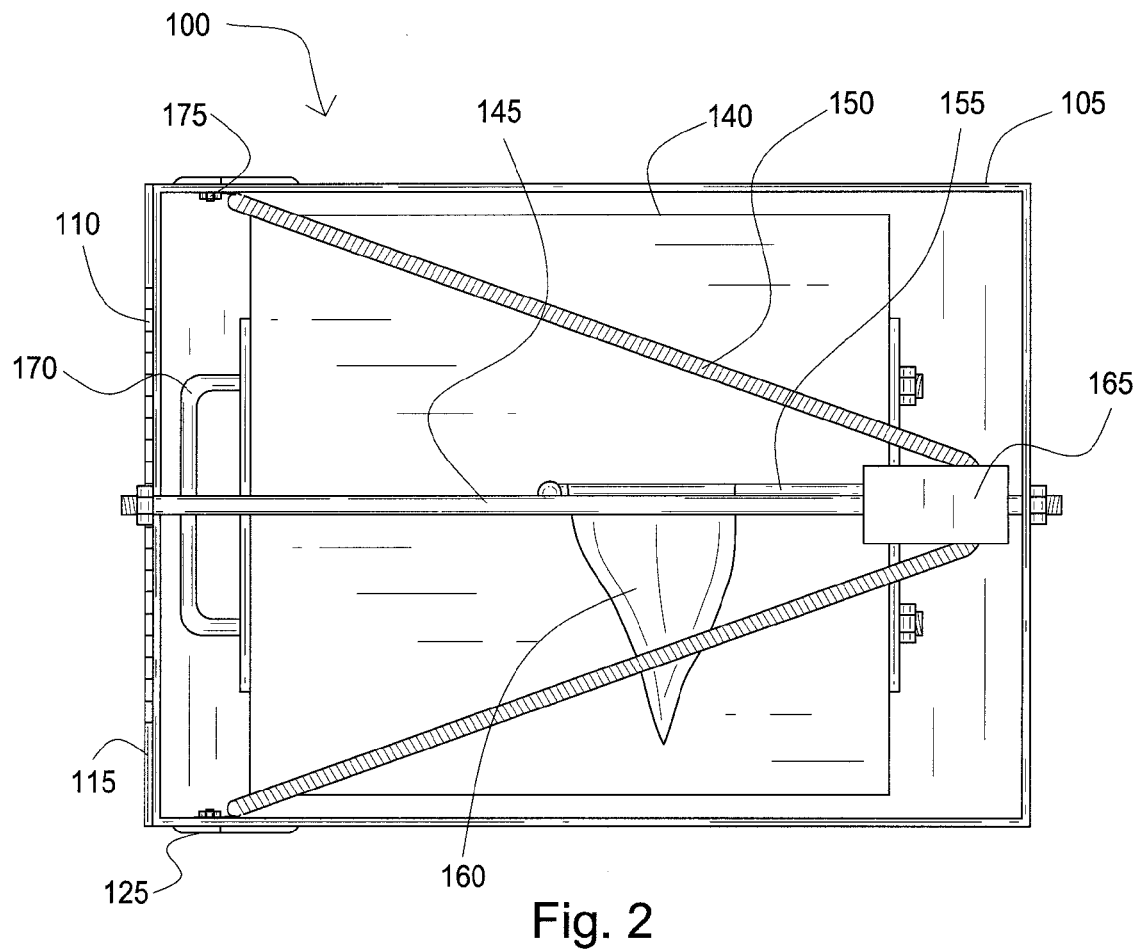
FIG. 2 is a top view of the chock holder of FIG. 1 with a top side of the holder removed to reveal the interior configuration thereof when a chock is stored therein according to one embodiment of the present invention.
Figure 4:
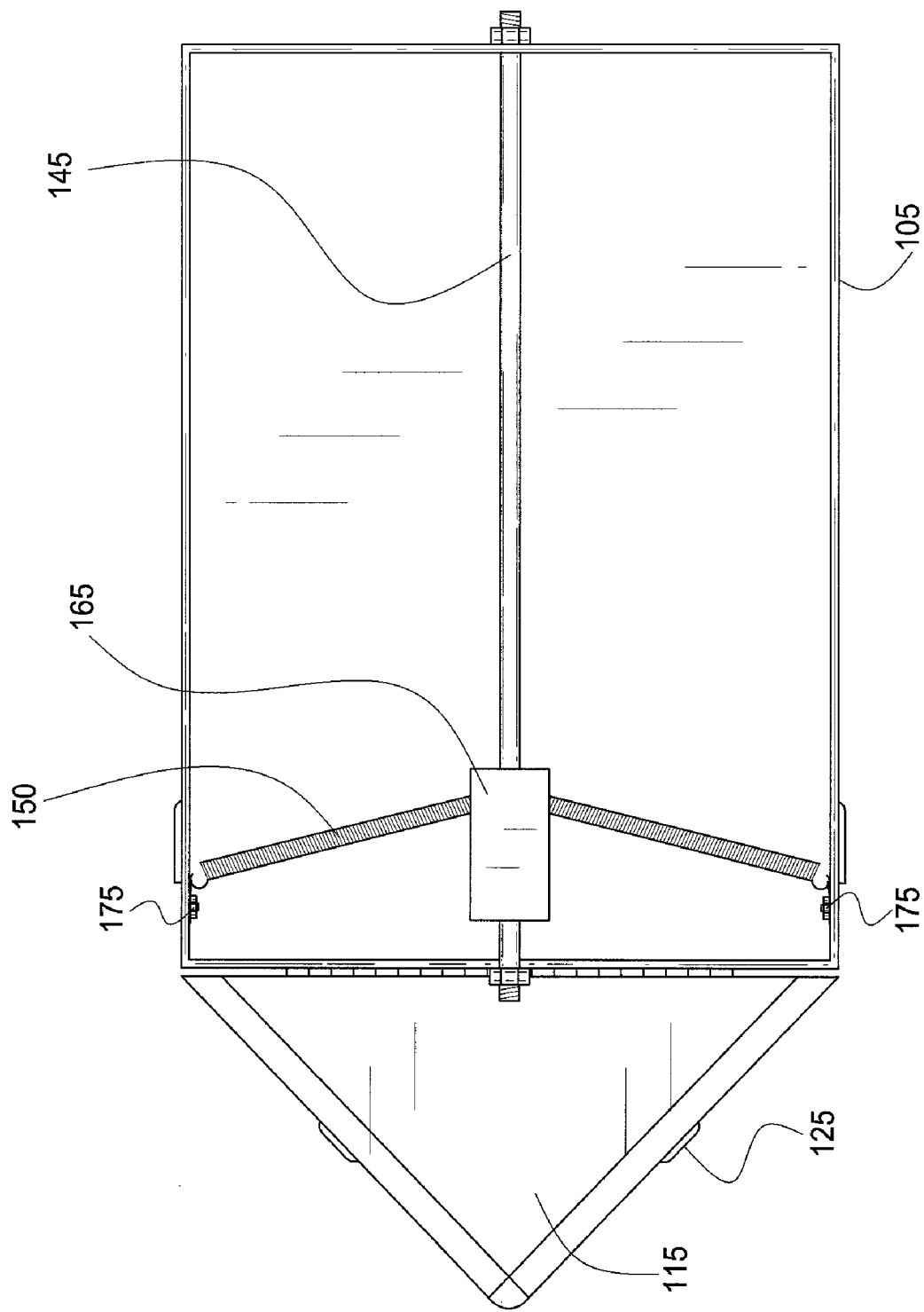
FIG. 4 is a top view of the chock holder of FIG. 1 with a top side of the holder removed to reveal the interior configuration thereof when a chock is removed therefrom according to one embodiment of the present invention.
Figure 5:
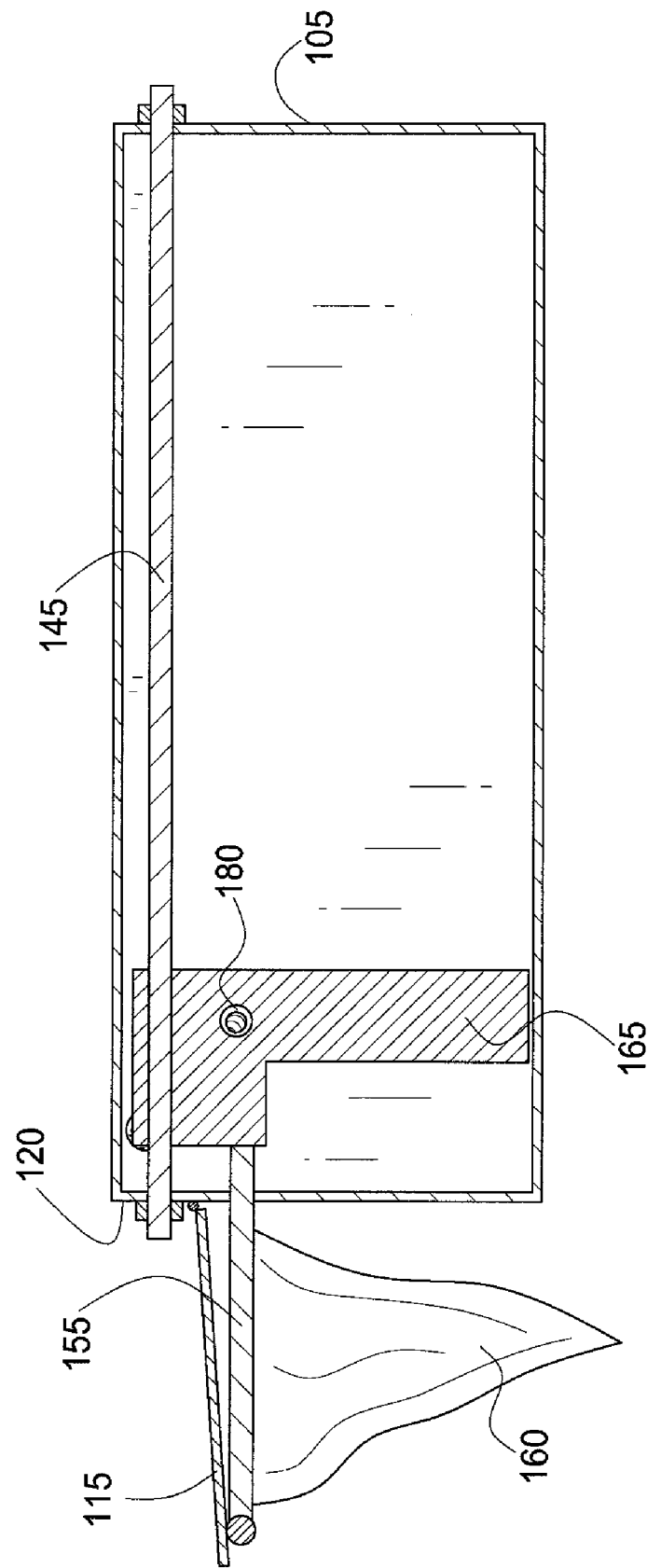
FIG. 5 is a cutaway view of the chock holder of FIG. 1 taken along line 3-3 to further illustrate the interior configuration thereof when a chock is removed therefrom according to one embodiment of the present invention.

As best shown in FIGS. 2 & 4, the coil spring 150 extends from a first end proximate the front edge of the left side through the spring bore 180 in the slider to a second end located proximate the front edge of the right side. The respective ends of the spring are secured in place with mechanical fasteners, such as but not limited to a nut, bolt and washer combination 175. In another variation, the spring ends can be secured to the top side of the container with mechanical fasteners for instance using the front two mounting holes 135. Accordingly, as the slider is moved rearwardly in the container, such as when a chock is inserted therein, the spring expands and exerts a forward biasing force on the slider. It is appreciated that the force is not sufficient to overcome the weight of the chock when the chock is stowed in the container, but when the chock is removed the force is more than sufficient to slide the slider outwardly to deploy the flag and hold the door in an open position.

The coil spring and its general configuration as illustrated herein are merely exemplary. Other types of springs or even other configurations of a coil spring can be utilized to provide the necessary biasing force. For instance, a coil spring could be placed over the guide rod between the slider and the rear side of the container such that the spring is compressed when the slider is moved rearwardly. Similarly, a coil spring could be placed over the rod between the front side flange and the front of the slider such that the spring is extended when the slider is moved rearwardly. In other variations, gas or coil spring units can be utilized. In yet other variations a torsion spring could be mounted to the front flange and be in operative communication with a spool having a cable wound thereon. The cable in turn can be coupled with the slider such moving the slider rearwardly pulls and unwinds the cable from the spool and biases the torsion spring. Numerous, other biasing configurations and mechanisms are contemplated as would be obvious to one of ordinary skill in the art given the benefit of this disclosure.

Operation of Chock Holder According to One Embodiment.

Figure 3:
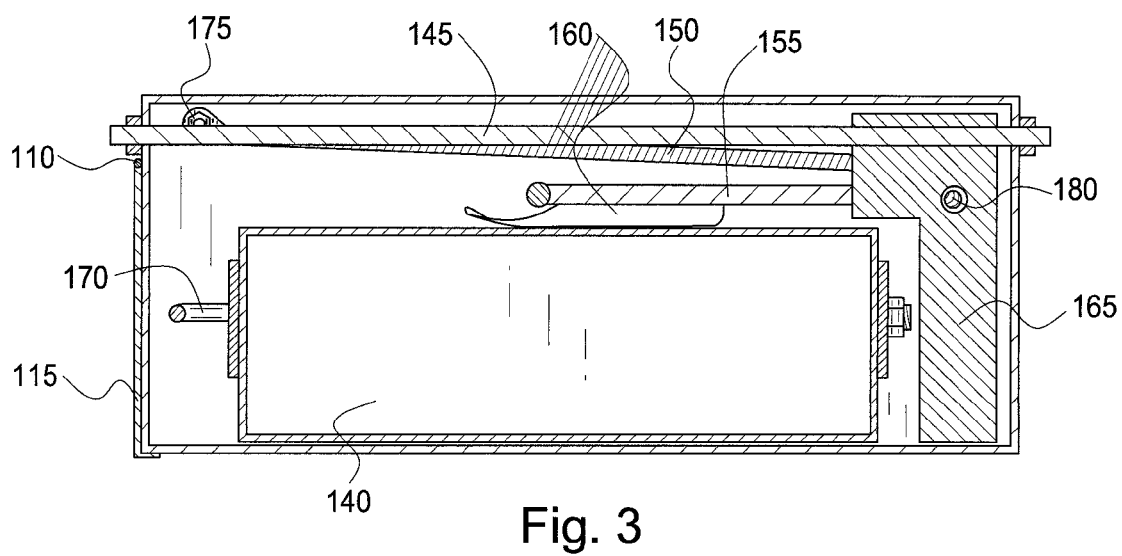
FIG. 3 is a cutaway view of the chock holder of FIG. 1 taken along line 3-3 to further illustrate the interior configuration thereof when a chock is stored therein according to one embodiment of the present invention.

The operation of the chock holder 100 is best described in relation to FIGS. 2-5 and FIGS. 7 & 8. Typically, a standard chock 140 as used to brace the wheels 210 of semi-trailers is stored within a chock holder as illustrated in FIGS. 2 & 3. The chock biases the slider rearwardly such that the flag 160 or other visual indicator is also pulled completely or at least substantially into the container 105. In the illustrated embodiment, a door 115 is provided with one or more latches to hold the chock in place and prevent its sliding out from the container while the trailer is in use. In other variations, the door may be eliminated and a stop can be provided to brace against the front end of the chock. Such a brace might be removable or spring loaded to permit the release of the chock.

Figure 8:
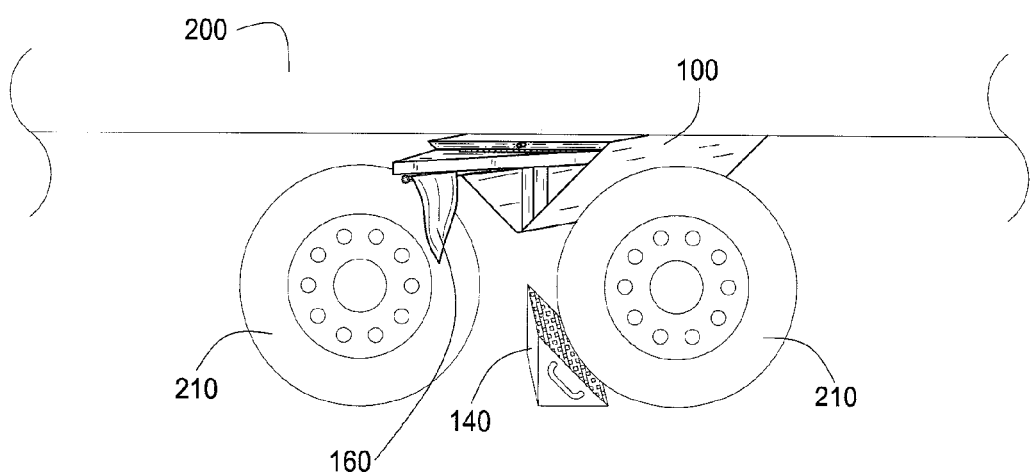
FIG. 8 is an isometric view of the chock holder installed on a trailer with the chock removed therefrom and braced against a wheel of the trailer according to one embodiment of the present invention.

As shown in FIGS. 7 & 8, the holder is typically secured to the bottom side of a trailer 200 such that the front side of the container or the associated door is generally aligned with one of the trailer's vertical side. As shown, the holder is mounted between two wheels, but the actual location along the side of the trailer can vary. Generally, however, the holder is mounted wherein the flag when deployed is readily and easily noticed in the side mirrors of a tractor attached to the trailer. When the holder is mounted on the underside portion of a cargo truck, the flag when deployed should be visible in the side mirrors of the cab.

After pulling up to a dock to load or unload a trailer, the operator or a dock work is required to chock one or more of the trailer's wheels. Accordingly the dock worker or operator unlatches the holder's door as necessary, opens the door and removes the chock. As the chock is removed by pulling it from the container, the slider slides forward as urged by the associated spring. The flag and flag pole typically extend beyond the open front face of the container and the pole holds the door in an open position. The flag flops downwardly into a readily visible orientation. The dock worker or operator then braces a wheel 210 with the chock 140 as is shown in FIG. 7.

When the operator needs to move the trailer, he/she picks up the chock and slides it back into the holder by pushing it into the container which causes the slider to move rearwardly and bias the spring. The flexible flag folds and is drawn into the container as well. The door falls into place once the flag pole is retracted and the operator latches the door closed as appropriate.

As mentioned above, it is not uncommon for an operator to get in his cab and prepare to depart having forgotten to retrieve his/her chocks. Using embodiments of the chock holder, the operator is instantly reminded the chock is not contained within its holder when he/she looks into a side mirror and sees the brightly colored flag or other indicator. If the chock remains under the trailer's wheel, he/she can return it to the container before departing. If another operator or dock worker has taken or pilfered the chock for use on another truck or trailer, the operator can retrieve it before departing.

Other Embodiment and Other Variations

The various preferred embodiments and variations thereof illustrated in the accompanying figures and/or described above are merely exemplary and are not intended to limit the scope of the invention. It is to be appreciated that numerous variations to the invention have been contemplated as would be obvious to one of ordinary skill in the art with the benefit of this disclosure. All variations and embodiments of the invention that read upon the appended claims are intended and contemplated to be within the scope of thereof.

For instance in at least one embodiment, the wheel chock can be coupled to the holder by way of a chain, cable or rope to prevent another from simply walking off with the chock. In variations, the cable or chain can be attached to a retractor that takes up the chain or cable as the chock is moved towards the container such that a user does not need to manually coil the chain or cable and place it in the container.

In yet another variations of the described embodiment, a secondary or alternative notification mechanisms are contemplated that comprise a visual indicator that is located within the interior of a trailer or on the top surface of a flat bed that indicates whether or not the chock is contained in the container. In one variation a brightly colored rod or other identifier is mechanically pushed through a hole drilled in the floor of the trailer that couples with a notification mechanism in the chock holder when the chock is contained in the holder. Accordingly, a dock work is alerted to the fact that the trailer is probably not properly chocked despite not having the ability to visually see the trailer's wheels. In such a variation, a mechanical means can be used to raise the visual indicator out of the floor as the chock is loaded into its holder. In yet another variation, a light can be provided in the cab that is illuminated when a switch is triggered when the chock is received in the holder. Conversely, the light might only illuminate when the chock is removed from the holder. The light, which can comprise a efficient LED, can by powered off of the truck's electrical system or the holder may have its own power source. The light may be operatively coupled to the switch in the holder electrical traces or a signal may be transmitted to a light assembly wirelessly from a holder located switch to cause the light assembly to illuminate.

I claim:

1. A chock holder comprising:
   a container having a closed end and a substantially open end and a triangular cross section with a three intersecting sides spanning between the respective open and closed ends, the container adapted to hold a single wheel chock therein;
   a door hingeably coupled to the container and substantially cover the open end when in a closed position; and
   a notification mechanism that (i) automatically deploys a flag outside of an interior of the container upon removal of the wheel chock from the container, (ii) maintains the door in an open position while the wheel chock is removed, and (iii) automatically retracts the flag when the wheel chock is placed into the container.

2. The chock holder of claim 1, wherein the notification mechanism comprises:
   a slider adapted to move between a first location proximate the closed end and a second position proximate the open end;
   a coil spring coupled with the slider to bias the slider towards the second location, the coil spring having a first end and a second end wherein (a) the first end is attached proximate the open end to a side of the three intersecting sides, (b) the coil spring extends through a bore in the slider, and (c) the second end is coupled proximate the open end to another side of the three intersecting sides; and
   the flag being coupled with the slider by way of a support, the flag being located (i) outside of the interior when the slider is in the second position, and (ii) inside of the interior when the slider is in the first position.

3. A chock holder comprising:
   a container having a closed end and a substantially open end with a plurality of sides spanning between the respective ends, the container adapted to hold at least one wheel chock therein; and
   a notification mechanism adapted to activate a visual indicator upon removal of the at least one wheel chock from the container;
   wherein the notification mechanism further includes
   (i) a slider adapted to move between a first position proximate the closed end and a second position proximate the open end,
   (ii) a biasing mechanism coupled with the slider to bias the slider towards the second position,
   (iii) a guide member extending substantially from an open end to a closed end, the slider being slidably coupled to the guide rod; and
   wherein the visual indicator comprises a flag coupled with the slider, the flag being located (a) outside of the interior when the slider is in the second position, and (b) inside of the interior when the slider is in the first position.

4. The chock holder of claim 3, wherein the container has a substantially triangular cross section and is adapted to contain a single wheel chock.

5. A combination of an over-the-road trailer and the chock holder of claim 1, wherein the chock holder is coupled to an underside of the trailer.

6. The chock holder of claim 1, wherein the biasing mechanism comprises a coil spring.

7. The chock holder of claim 1 further comprising a door hingeably coupled to a top side of the plurality of sides and adapted to substantially cover the open side when a chock is stowed therein.

8. The chock holder of claim 7, wherein the flag is coupled to the slider through a flag pole, the flag pole adapted to hold the door in an open position when the flag is deployed outside of the container.

9. A combination of a chock holder of claim 1 and a wheel chock, the wheel chock holding the slider in the first position when the wheel chock is contained in the interior.

10. A combination comprising an over-the-road trailer and a chock holder, the chock holder being mounted to an underside of the trailer proximate a left or right edge thereof, the chock holder including: (i) a container having a closed end and a substantially open end with three intersecting sides spanning between the respective ends, the container adapted to hold at least one wheel chock therein; and (ii) a notification mechanism that automatically deploys a flag outside of an interior of the container upon removal of the at least one wheel chock from the container.

11. The combination of claim 10, wherein the notification mechanism comprises: (a) a slider adapted to move between a first location proximate the closed end and a second position proximate the open end; (b) a spring coupled with the slider to bias the slider towards the second location; and (c) a flag coupled with the slider, the flag being located (i) outside of the interior when the slider is in the second position, and (ii) inside of the interior when the slider is in the first position.

12. The combination of claim 10, wherein the chock holder further comprises a door that is hingeably coupled to the container, the door substantially covering the substantially open end when in a closed position.

13. The combination of claim 10, wherein a top side of the three intersecting sides is adapted for mounting to the underside of a horizontal surface.

14. A method of chocking a wheel of the over-the-road trailer using the combination of claim 10, the method comprising:

parking the trailer;

removing the least one wheel chock from the chock holder causing the flag to be automatically deployed to a position outside of the interior; and chocking a wheel of the trailer with the at least one chock.

15. The method of claim 14, further comprising:

removing the chock from underneath the wheel; and placing the chock into the chock holder causing the flag to retract into the interior of the container.

\* \* \* \* \*